United States Patent [19]
Yang et al.

[11] Patent Number: 6,005,620
[45] Date of Patent: Dec. 21, 1999

[54] STATISTICAL MULTIPLEXER FOR LIVE AND PRE-COMPRESSED VIDEO

[75] Inventors: Chao-Kung Yang, Huntington Beach; Jim C. Williams, Anaheim, both of Calif.; Leon Stanger, Farmington, Utah; Robert H. Plummer, Seattle, Wash.

[73] Assignee: Hughes Electronics Corporation, El Segundo, Calif.

[21] Appl. No.: 08/792,627

[22] Filed: Jan. 31, 1997

[51] Int. Cl.[6] .................................................. H04N 7/12
[52] U.S. Cl. ........................................ 348/385; 348/845.2
[58] Field of Search .................................. 348/385, 387, 348/388, 389, 390, 403, 404, 405, 423, 845.2; 382/248; 370/477, 468, 422, 395, 444, 410, 537, 538, 230, 434, 540; H04N 7/12

[56] References Cited

U.S. PATENT DOCUMENTS

| | | | |
|---|---|---|---|
| 4,093,823 | 6/1978 | Chu | 370/538 |
| 4,494,232 | 1/1985 | Dambrackas et al. | 370/477 |
| 4,587,514 | 5/1986 | Schas et al. | 340/347 DD |
| 4,626,829 | 12/1986 | Hauck | 340/347 DD |

(List continued on next page.)

FOREIGN PATENT DOCUMENTS

| | | |
|---|---|---|
| 574 724 A2 | 12/1993 | European Pat. Off. . |
| 615 384 A2 | 9/1994 | European Pat. Off. . |
| 621 730 A2 | 10/1994 | European Pat. Off. . |
| 712 251 A2 | 5/1996 | European Pat. Off. . |
| 273653 | 1/1996 | Japan . |
| 96/13125 | 5/1996 | WIPO . |

OTHER PUBLICATIONS

Abbas et al., "Performance analysis of an ATM statistical multiplexer with batch arrivals", IEE Proc.–Commun., vol. 141, No. 3, Jun. 1994, pp. 190–195.

Anderson et al., "Support For Continuous Media in the Dash System[1]", 1990 IEEE, pp. 54–61.

(List continued on next page.)

Primary Examiner—Tommy P. Chin
Assistant Examiner—Y. Lee
Attorney, Agent, or Firm—John A. Crook; Michael W. Sales

[57] ABSTRACT

An apparatus for statistically multiplexing a plurality of video signals is provided with a complexity detector, coupled to receive a pre-compressed video signal, for generating a complexity signal which relates to the complexity of the pre-compressed video signal, an encoder for compressing a non-compressed video signal at a variable compression rate to generate a compressed video signal, a controller for controlling the variable compression rate of the encoder based on the complexity signal, and a multiplexer coupled to receive the pre-compressed video signal and the compressed video signal. The apparatus may be provided in a broadcasting system, such as a satellite broadcasting system. The broadcast system may include a transmitter coupled to receive the video signals from the multiplexer, a satellite coupled to receive the video signals from the transmitter, a receiver for receiving video signals from the satellite, and one or more decoders connected to receive video signals from the receiver.

28 Claims, 3 Drawing Sheets

U.S. PATENT DOCUMENTS

| | | |
|---|---|---|
| 4,888,779 | 12/1989 | Karabed et al. . |
| 4,918,523 | 4/1990 | Simon et al. .......................... 358/133 |
| 4,975,771 | 12/1990 | Kassatly .................................. 358/146 |
| 5,005,171 | 4/1991 | Modisette, Jr. et al. . |
| 5,038,389 | 8/1991 | Mizuno .................................. 382/248 |
| 5,097,261 | 3/1992 | Langdon, Jr. et al. .................. 341/51 |
| 5,115,309 | 5/1992 | Hang ...................................... 70/468 |
| 5,122,873 | 6/1992 | Golin ..................................... 348/390 |
| 5,128,754 | 7/1992 | Dhein .................................... 358/105 |
| 5,136,375 | 8/1992 | Citta et al. ............................. 358/133 |
| 5,216,503 | 6/1993 | Paik et al. .............................. 348/390 |
| 5,231,494 | 7/1993 | Wachob ................................. 358/146 |
| 5,291,281 | 3/1994 | Paik et al. .............................. 348/384 |
| 5,319,457 | 6/1994 | Nakahashi et al. ..................... 348/387 |
| 5,319,707 | 6/1994 | Wasilewski et al. .................... 380/14 |
| 5,361,096 | 11/1994 | Ohki et al. . |
| 5,367,334 | 11/1994 | Nishino et al. . |
| 5,376,968 | 12/1994 | Wu et al. ............................... 348/413 |
| 5,392,223 | 2/1995 | Caci ....................................... 364/514 |
| 5,400,401 | 3/1995 | Wasilewski et al. ..................... 380/9 |
| 5,432,790 | 7/1995 | Hluchyj et al. ......................... 370/468 |
| 5,440,334 | 8/1995 | Walters et al. . |
| 5,442,626 | 8/1995 | Wei ........................................ 370/20 |
| 5,446,916 | 8/1995 | Derovanessian et al. .............. 395/800 |
| 5,448,568 | 9/1995 | Delpuch et al. ........................ 372/94.2 |
| 5,461,619 | 10/1995 | Citta et al. . |
| 5,475,716 | 12/1995 | Huang .................................... 375/354 |
| 5,479,210 | 12/1995 | Cawley et al. .......................... 348/390 |
| 5,495,291 | 2/1996 | Adams . |
| 5,499,245 | 3/1996 | Lee et al. ............................... 370/94.2 |
| 5,506,844 | 4/1996 | Rao ........................................ 370/477 |
| 5,509,017 | 4/1996 | Brandenburg et al. ................. 370/112 |
| 5,515,377 | 5/1996 | Horne et al. ........................... 370/94.1 |
| 5,521,945 | 5/1996 | Knudson . |
| 5,532,744 | 7/1996 | Akiwumi-Assani et al. .......... 348/390 |
| 5,533,009 | 7/1996 | Chen ...................................... 370/17 |
| 5,541,852 | 7/1996 | Eyuboglu et al. ..................... 364/514 C |
| 5,548,532 | 8/1996 | Menand et al. ....................... 364/514 C |
| 5,550,589 | 8/1996 | Shiojiri et al. ......................... 348/385 |
| 5,550,590 | 8/1996 | Sakazawa et al. ..................... 348/385 |
| 5,557,419 | 9/1996 | Muto . |
| 5,561,791 | 10/1996 | Mendelson et al. . |
| 5,563,961 | 10/1996 | Rynderman et al. .................. 382/239 |
| 5,583,562 | 12/1996 | Birch et al. . |
| 5,592,470 | 1/1997 | Rudrapatna et al. . |
| 5,594,491 | 1/1997 | Hodge et al. . |
| 5,612,742 | 3/1997 | Krause et al. . |
| 5,629,736 | 5/1997 | Haskell et al. . |
| 5,633,683 | 5/1997 | Rosengren et al. .................... 348/385 |
| 5,646,942 | 7/1997 | Oliver et al. ........................... 348/385 |
| 5,675,732 | 10/1997 | Majeti et al. . |
| 5,682,387 | 10/1997 | Satoh ..................................... 370/468 |
| 5,687,163 | 11/1997 | Fox et al. . |
| 5,708,664 | 1/1998 | Budge et al. ........................... 348/385 |
| 5,719,632 | 2/1998 | Hoang et al. ........................... 348/419 |
| 5,754,783 | 5/1998 | Mendelson et al. . |
| 5,757,801 | 5/1998 | Arimilli .................................. 370/444 |
| 5,771,316 | 6/1998 | Uz . |
| 5,790,177 | 8/1998 | Kassatly . |
| 5,793,425 | 8/1998 | Balakrishnan ......................... 348/387 |
| 5,796,724 | 8/1998 | Rajamani et al. . |
| 5,812,334 | 9/1998 | Behrens et al. . |
| 5,847,760 | 12/1998 | Elmaliach et al. ..................... 348/390 |
| 5,854,658 | 12/1998 | Uz et al. ................................ 348/419 |
| 5,862,140 | 1/1999 | Shen et al. ............................. 348/387 |

OTHER PUBLICATIONS

Beakley, "Channel Coding for Digital HDTV Terrestrial Broadcasting", IEEE Transactions on Broadcasting, vol. 37, No. 4, Dec. 1991, pp. 137–140.

Dixit et al., "Video Traffic Smoothing and ATM Multiplexer Performance", 1991 IEEE, pp. 8B.3.1–8B.3.5.

Eleftheriadis et al., "Optimal Data Partitioning of MPEG–2 Coded Video", 1994 IEEE, pp. 273–277.

Eng et al., "Time–Compression Multiplexing (TCM) of Three Broadcast–Quality TV Signals on a Satellite Transponder", The Bell System Technical Journal, vol. 62, No. 10, Part 1, Dec. 1983, pp. 2853–2863.

Garcia et al., "Statistical Multiplexing Gain Using Space Priority Mechanisms", 1991 IEEE, pp. 27.3.1–27.3.5.

Gemmell et al., "Multimedia Storage Servers: A Tutorial", IEEE, May 1995, pp. 40–49.

Guha et al., "Multichannel Joint Rate Control of VBR MPEG Encoded Video for DBS Applications", IEEE Transactions on Consumer Electronics, vol. 40, No. 3, Aug. 1994, pp. 616–623.

Haskell et al., "Multiplexing of Variable Rate Encoded Streams", IEEE Transactions on Circuits and Systems for Video Technology, vol. 4, No. 4, Aug. 1994, pp. 417–424.

Haskell et al., "Variable BIT–Rate Video Coding for ATM and Broadcast Applications", 1993 IEEE, pp. I–114–I–116.

Hulyalkar et al., "Advanced Digital HDTV Transmission System for Terrestrial Video Simulcasting", IEEE Journal On Selected Areas In Communications, vol. 11, No. 1, Jan. 1993, pp. 119–126.

Inoue et al., "Encoding and Decoding in the 60MHz NTSC––Compatible Widescreen Television System", IEEE Transactions on Circuits and Systems for Video Technology, vol. 1, No. 1, Mar. 1991, pp. 49–58.

Kao et al., "Time–Multiplexed Analog Transmission of Three Broadcast–Quality Television Channels Through One Satellite Transponder", IEEE Journal On Selected Areas In Communications, vol. SAC–5, No. 4, May 1987, pp. 676–684.

Keesman et al., "Analysis of Joint Bit–Rate Control in Multi–Program Image Coding", SPIE vol. 2308, 1994, pp. 1906–1917.

Krunz et al., "Statistical Characteristics and Multiplexing of MPEG Streams", 1995 IEEE, pp. 455–462.

Kuo, Geng–Sheng, "A New Generalized Framework for VOD Transmission on Future High–Speed BISDN", IEEE Transactions on Consumer Electronics, vol. 42, No. 1, Feb. 1996, pp. 101–111.

Lee et al., "Dynamic Bandwidth Allocation for Multiple VBR MPEG Video Sources", 1994 IEEE, pp. 268–272.

Liew et al., "Video Aggregation: Adapting Video Traffic for Transport Over Broadband Networks by Integrating Data Compression and Statistical Multiplexing", IEEE Journal On Selected Areas In Communications, vol. 14, No. 6, Aug. 1996, pp. 1123–1137.

Pancha et al., "Bandwidth–Allocation Schemes for Variable–Bit–Rate MPEG Sources in ATM Networks", IEEE Transactions on Circuits and Systems for Video Technology, vol. 3, No. 3, Jun. 1993, pp. 190–198.

Panchanathan et al., "Robust Algorithms for Image Transmission over ATM Networks", SPIE vol. 2308, 1994, pp. 1918–1923.

Reininger et al., "Statistical Multiplexing of VBR MPEG Compressed Video on ATM Networks", 1993 IEEE, pp. 919–926.

Robinson et al., "The Influence of Scene Content on Bit–Rate Variations in ATM Video", 5 pages, undated.

Saleh et al., "Simulation Analysis of a Communication Link with Statistically Multiplexed Bursty Voice Sources", IEEE Journal On Selected Areas In Communications, vol. 11, No. 3, Apr. 1993, pp. 432–442.

Tse et al., "Video Aggregation: An Integrated Video Compression and Multiplexing Scheme for Broadband Networks", 1995 IEEE, pp. 439–446.

Tse et al., "Statistical Multiplexing of Multiple Time–Scale Markov Streams", IEEE Journal On Selected Areas In Communications, vol. 13, No. 6, Aug. 1995, pp. 1028–1038.

Vin et al., "Designing a Multiuser HDTV Storage Server", IEEE Journal On Selected Areas In Communications, vol. 11, No. 1, Jan. 1993, pp. 153–164.

Wu et al., "Computational Methods for Performance Evaluation of a Statistical Multiplexer Supporting Bursty Traffic", IEEE Transactions On Networking, vol. 4, No. 3, Jun. 1996, pp. 386–397.

Technology Demonstration by DMV, Imedia and Silicon Graphics, NAB '96, Apr. 15–18, 2 pages.

Imedia Corporation, Company Backgrounder, Apr. 1996, 6 pages.

Imedia Corporation, "Imedia StatMux™ Increased Channel Utilization: Many More Channels" (undated), 5 pages.

Imedia Corporation, "Imedia StatMux™—24 Digital Channels in the Space of 1 Analog Channel" (undated), 9 pages.

J. Feng et al., *Interleaving schemes for ATM multiplexing of MPEG video sources,* IEEE, 1996, pp. 2315–2317.

Jiro Katto et al., *Mathematical Analysis Of MPEG Compression Capability And Its Application To Rate Control,* IEEE, 1995, pp. 555–558.

P.N. Anirudhan et al., *A Study Of The Host–Network Interface For MPEG Based Desktop Video Conferencing,* IEEE, 1995, pp. 1930–1936.

John Lauderdale et al., *A New Technique for Transmission of Pre–Encoded MPEG VBR Video Using CBR Service,* IEEE, 1996, pp. 1416–1420.

STATISTICAL MULTIPLEXER FOR LIVE AND PRE-COMPRESSED VIDEO

BACKGROUND OF THE INVENTION

The present invention relates to a statistical multiplexer for use in a video broadcast system.

Conventional video broadcast systems for transmitting video signals from a central location to a plurality of remote viewing locations may be of several different types, including cable television systems and satellite-based broadcast systems. Since the overall bandwidth of a video broadcast system is limited, there is a limit to the number of video channels that can be included in a broadcast transmission.

U.S. Pat. No. 5,216,503 to Paik, et al. discloses a statistical multiplexing apparatus which is used to selectively compress a plurality of video signals prior to being broadcast. In the Paik, et al. system, each video signal is provided to an encoder prior to being broadcast. Each encoder is connected to a respective buffer, which is in turn connected to a multiplexer. Each encoder is connected to a controller, which generates coding level commands to control the degree to which the encoders compress the video signals.

SUMMARY OF THE INVENTION

The invention is directed to an apparatus for statistically multiplexing a plurality of video signals. The apparatus includes a complexity detector, coupled to receive a pre-compressed video signal, for generating a complexity signal which relates to the complexity of the pre-compressed video signal, an encoder for compressing a non-compressed video signal at a variable compression rate to generate a compressed video signal, a controller for controlling the variable compression rate of the encoder based on the complexity signal, and a multiplexer coupled to receive the pre-compressed video signal and the compressed video signal.

The statistical multiplexing apparatus may have first and second complexity detectors which generate first and second complexity signals which relate to the complexity of first and second video signals, respectively, and first and second encoders for compressing the first and second video signals at variable compression rates to generate a first and second compressed video signals, which are then multiplexed together with the pre-compressed video signal.

The apparatus may be provided in a broadcasting system, such as a satellite broadcasting system. The broadcast system may include a transmitter coupled to receive the video signals from the multiplexer, a satellite coupled to receive the video signals from the transmitter, a receiver for receiving video signals from the satellite, and one or more decoders connected to receive video signals from the receiver.

The statistical multiplexing apparatus may also include a third encoder for compressing the first video signal to generate a third compressed video signal and a fourth encoder for compressing the second video signal to generate a fourth compressed video signal. The third encoder is connected to transmit the third compressed video signal to the first complexity detector, and the fourth encoder is connected to transmit the fourth compressed video signal to the second complexity detector.

The controller of the statistical multiplexing apparatus may include means for generating a summing signal representing the sum of the complexities of the first and second video signals, means for generating a compression factor for one of the first and second video signals based upon the summing signal and the complexity signal for the one video signal, and means for causing one of the first and second encoders to compress the one video signal based on the compression factor.

The invention is also directed to a method of statistically multiplexing a plurality of video signals. The method includes the steps of generating first, second and third complexity signals representing the complexity of first, second and third video signals, respectively, generating first and second compression factors based on the first and second complexity signals, respectively, and compressing the first and second video signals at variable compression rates based upon the first and second compression factors.

The step of generating the first compression factor may include the steps of generating a summing signal representing the sum of the complexities of the first and second video signals and generating the first compression factor based upon the summing signal and the third complexity signal. The method may also include the steps of multiplexing the first and second compressed video signals with the pre-compressed video signals and broadcasting the multiplexed video signals to a plurality of remote locations.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
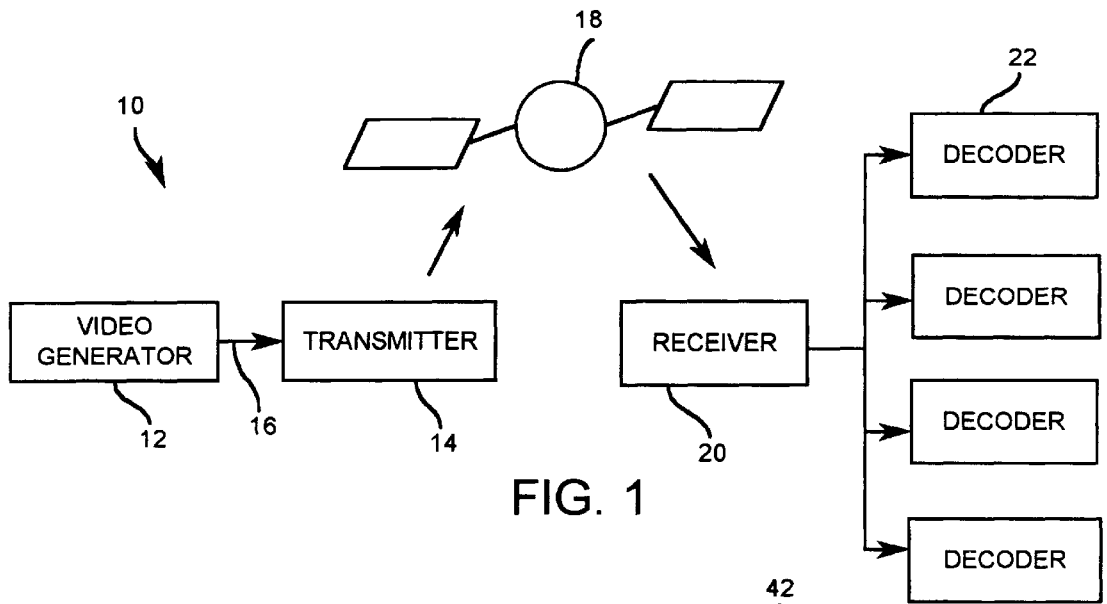
FIG. 1 is a block diagram of a preferred embodiment of a video broadcast system in accordance with the invention.

A preferred embodiment of a video broadcast system 10 in accordance with the invention is illustrated in FIG. 1. Referring to FIG. 1, the system 10 includes a video generator 12 connected to transmit a multiplexed video data stream to a conventional transmitter 14 via a data link 16. The transmitter 14 transmits the video data stream to a satellite 18, and video data is broadcast by the satellite 18 to a plurality of conventional receivers 20, one of which is shown in FIG. 1. Each receiver 20 may correspond to a house or a multiple dwelling unit, such as an apartment building. Where the receiver 20 is used for a multiple dwelling unit, the receiver 20 is connected to a plurality of decoders 22, each of which corresponds to a separate dwelling unit within the multiple dwelling unit.

Figure 4:
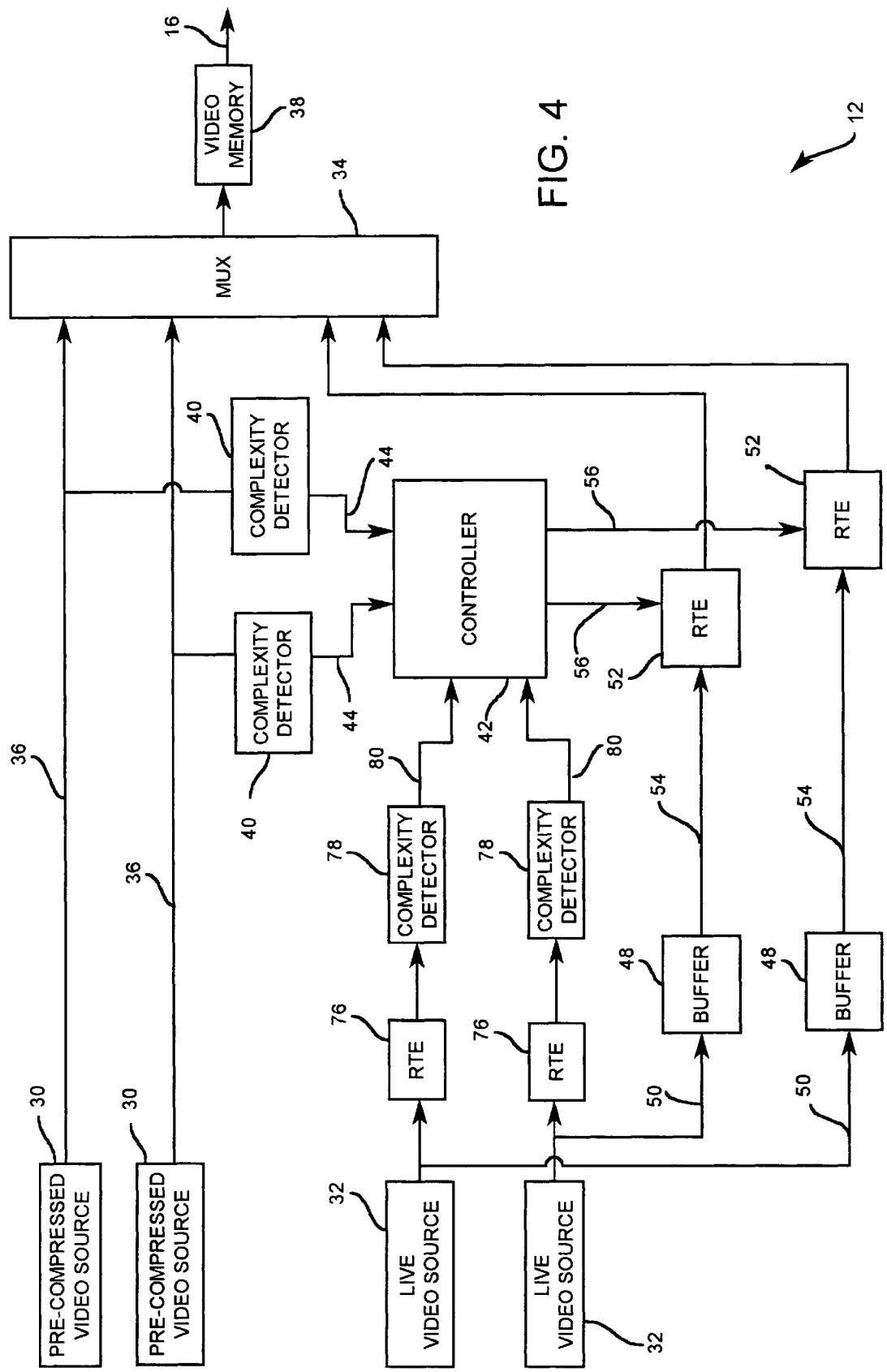
FIG. 4 is a block diagram of the video generator shown in FIG. 1.

FIG. 4 illustrates a block diagram of the video generator 12 shown schematically in FIG. 1. Referring to FIG. 4, the video generator 12 includes a pair of pre-compressed video sources 30 and a pair of live video sources 32. Although only four video sources are shown, it should be understood that any number of live and pre-compressed video sources 30, 32 could be used. Each pre-compressed video source 30 may be any type of source of pre-compressed video signals, such as a digital video disk (DVD). The video signals may be pre-compressed in any conventional manner, such as in accordance with MPEG (Moving Pictures Experts Group) standards.

The video signal provided by each pre-compressed video source 30, which may correspond to one or more movies or prerecorded programming, is transmitted to a conventional multiplexer 34 via a line 36. The multiplexer 34 may be connected to a conventional video memory 38 for temporary storage prior to transmission of the multiplexed video signals to the satellite 18 by the transmitter 14 (FIG. 1).

The pre-compressed video signals generated by the video sources 30 are also transmitted to a pair of complexity detectors 40, each of which is connected to a controller 42 via a respective line 44. Each complexity detector 40 generates a signal relating to the complexity of each successive video frame of the pre-compressed video signal provided to it. The complexity detectors 40 could be any type of detectors. For example, each complexity detector 40 could be a bit counter that counts the number of data bits of the compressed video signal that was used to encode each video frame. Such a complexity signal would thus correspond to the bit rate (e.g. bits/second) of the pre-compressed video signals.

Each of the live video sources 32 could comprise, for example, a conventional memory or buffer for temporarily storing a live video signal corresponding to, for example, a live sporting event or news channel. The live video signals generated by the sources 32, which may be video signals that have not yet been compressed, are provided to a pair of delay buffers 48 via a pair of lines 50, and then to a pair of real-time encoders (RTE) 52 via a pair of lines 54.

Each RTE 52 compresses its associated video signal at a variable rate, depending upon a compression factor generated by the controller 42 and transmitted to the RTE 52 via a line 56. After being compressed, the video signals are transmitted to the multiplexer 34, where they are multiplexed with the pre-compressed video signals on the lines 36 and transmitted to the video memory 38.

The processing of the audio signals which typically accompany the video signals in the video broadcast system 10 is not considered germane to the invention. Such audio signals would be encoded, if necessary, and then transmitted to the multiplexer 34 for multiplexing together with the video signals.

Figure 3:
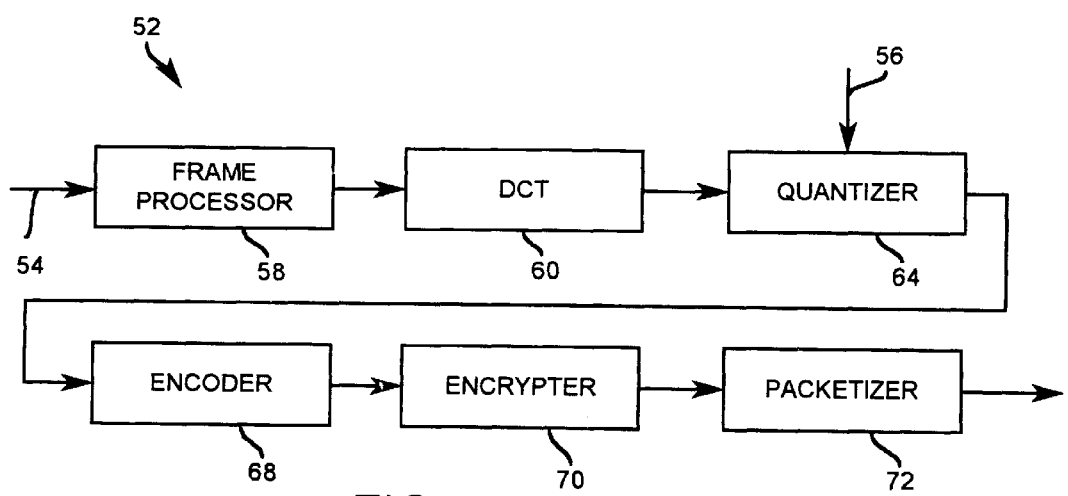
FIG. 3 is a block diagram of a real-time encoder used in the video broadcast system.

Each RTE 52 can be any type of conventional real-time encoder. FIG. 3 illustrates one embodiment of an RTE 52 which may be used to compress a video signal in accordance with a standard MPEG compression protocol. Referring to FIG. 3, the RTE 52 includes a conventional frame processor 58 that separates the video signal provided on the line 54 into video frames (e.g. 24 video frames per second). A discrete-cosine transform (DCT) circuit 60 converts the video signal from the frame processor 58 into a plurality of transform coefficients, each transform coefficient being represented by a plurality of data bits.

The video signal is then provided to a conventional quantizer 64 which compresses the video signal by reducing a number of data bits from the transform coefficients based upon the magnitude of a quantizing factor, referred to generally as a compression factor, provided to the quantizer 64 via the line 56 from the controller 42. The video signal is then encoded by an encoder 68 in a conventional manner, and if necessary or desired, the video signal may be encrypted by an encrypter 70. The video signal is then converted into data packets suitable for broadcast transmission by a packetizer 72. The particular design of the RTEs 52 is not considered important to the invention, and alternative designs could be used. For example, the encoder disclosed in U.S. Pat. No. 5,216,503 to Paik, et al., the disclosure of which is incorporated herein by reference, could be used.

Referring to FIG. 4, the video signals from the live sources 32 are provided to another pair of RTEs 76, which may have the design described above in connection with FIG. 3. Each RTE 76 compresses its respective video signal in accordance with a predetermined, constant quantizing factor, which quantizing factor may be the same for all the RTEs 76.

After each video signal is compressed by its respective RTE 76, each compressed signal is provided to a respective complexity detector 78, which generates a complexity signal representative of the complexity of the compressed video signal. For example, each complexity detector 78 could be a bit counter which counts the number of data bits which represent each successive video frame of the video signal. More complex video frames have more data bits in the compressed video signal, whereas less complex frames have fewer data bits. The complexity signals for each successive video frame are transmitted from the complexity detectors 78 to the controller 42 via a pair of lines 80. The amount of delay caused by the delay buffers 48 corresponds to the amount of time which elapses between the transmission of the live video signals to the RTEs 76 and the transmission of the compression factors to the RTEs 52 via the lines 56.

Figure 2:
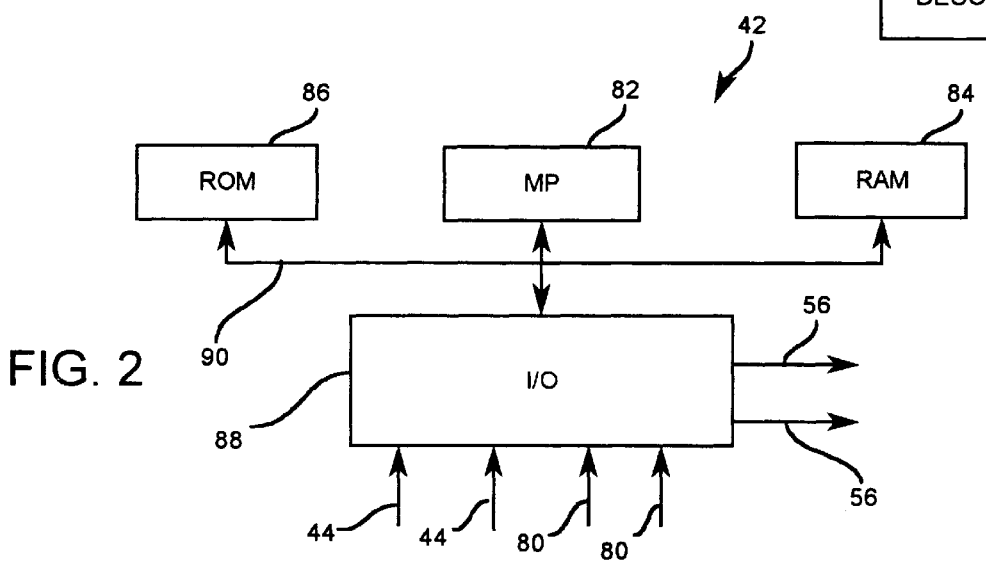
FIG. 2 is a block diagram of a controller used in the video broadcast system.

Referring to FIG. 2, the controller 42 may take the form of a conventional computer system having a microprocessor (MP) 82, a random-access memory (RAM) 84, a program memory such as a read-only memory (ROM) 86, and an input/output (I/O) circuit 88, all of which are interconnected via an address/data bus 90. The overall operation of the controller 42 is controlled by a computer program stored in the program memory 86 and executed by the microprocessor 82.

Figure 5:
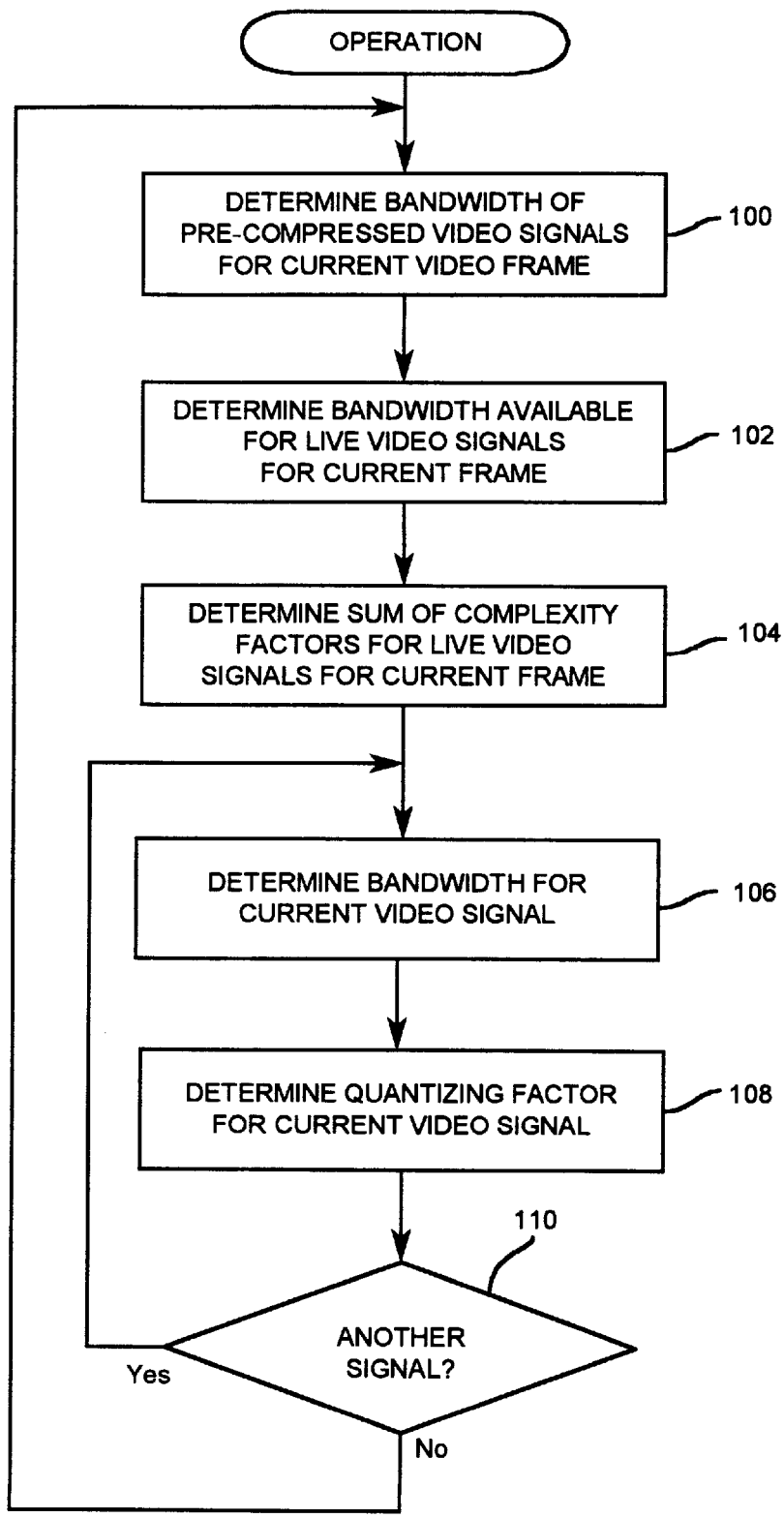
FIG. 5 is a flowchart which illustrates the operation of the video broadcast system.

FIG. 5 is flowchart of a computer program which controls the operation of the controller 42. Referring to FIG. 5, at step 100, the bandwidth (e.g. in data bits/second) of the pre-compressed video signals for the current video frame is determined by adding together all of the complexity signals generated by the complexity detectors 40.

At step 102, the bandwidth available for the live video sources 32, $BW_{LIVE}$, is determined by subtracting the pre-compressed video bandwidth determined at step 100 from the total video bandwidth available for the broadcast system 10. At step 104, the sum of the complexity factors for the live video signals, $C_{SUM}$, for the current video frame is determined by adding together the complexity signals generated by the complexity detectors 78.

Steps 106–110 are performed to determine the compression factors that are transmitted to the RTEs 52 via the lines 56 to control the degree to which the live video signals are compressed by the RTEs 52. At step 106, the bandwidth available for one of the live video signals is determined in accordance with the following equation:

$$BW_I = C_I/C_{SUM} * BW_{LIVE},$$

where $BW_I$ is the bandwidth available for the "Ith" of N video signals, where $C_I$ is the complexity factor for the Ith video signal, where $C_{SUM}$ is the sum of all the complexity factors determined at step 104, and where $BW_{LIVE}$ is the bandwidth available for all of the live video signals.

At step 108, the bandwidth $BW_I$ for the current video signal determined in step 106 is converted to a corresponding compression factor, in the form of a quantizing factor, which is then transmitted to the corresponding RTE 52 to specify the rate of compression of the video signal by that RTE 52. The conversion may be accomplished, for example, by a memory lookup table which specifies a plurality of bandwidth ranges and a particular quantizing factor for each range.

At step 110, if there is another live video signal for the current video frame, the program branches back to step 106 so that steps 106–108 are repeated for the next live video signal. Thus, where there are ten live video signals, steps 106–110 will be repeated ten times, once for each signal. If there are no more live video signals for the current video frame, the program branches back to step 100, so that the routine is repeated for the next video frame.

From the above description, it should be understood that each of the live video signals is examined for complexity on a frame-by-frame basis, and the bandwidth available for the live video signals is dynamically allocated, on a frame-by-frame basis, depending upon the complexity of each live video signal. Consequently, live video signals having more complex frames are allocated more bandwidth than signals having less complex video frames to ensure that the overall image resolution for the live video signals is maximized for the limited overall bandwidth available for the system 10.

Modifications of the above routine could be utilized. For example, the bandwidth for each signal determined at step 106 could be compared with upper and lower bandwidth limits. Any bandwidth value that exceeded one of the limits could be set equal to that limit. Any bandwidth excess or deficiency due to setting the bandwidth values to such limits could be allocated to the remaining live video signals whose bandwidth values fell within the upper and lower bandwidth limits.

Other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An apparatus for statistically multiplexing a plurality of video signals, said apparatus comprising:
    at least two complexity detectors coupled to receive pre-compressed video signals having complexity which varies over time, said complexity detectors generating at least two complexity signals which relate to said complexity of said pre-compressed video signals;
    at least one encoder for compressing a non-compressed video signal at a variable compression rate to generate a compressed video signal;
    a controller for controlling said variable compression rate of said encoder based on said at least two complexity signals; and
    a multiplexer coupled to receive said pre-compressed video signals and said compressed video signal.

2. An apparatus as defined in claim 1 additionally comprising a pre-compressed video source for generating at least one of said pre-compressed video signals.

3. An apparatus as defined in claim 1 additionally comprising a buffer for temporally delaying said non-compressed video signal before said non-compressed video signal is provided to said encoder.

4. An apparatus for statistically multiplexing a plurality of video signals, said apparatus comprising:
    a first complexity detector coupled to receive a first video signal having a complexity which varies over time, said first complexity detector generating a first complexity signal which relates to said complexity of said first video signal;
    a second complexity detector coupled to receive a second video signal having a complexity which varies over time, said second complexity detector generating a second complexity signal which relates to said complexity of said second video signal;
    a first encoder for compressing said first video signal at a variable compression rate to generate a first compressed video signal;
    a second encoder for compressing said second video signal at a variable compression rate to generate a second compressed video signal;
    a third complexity detector coupled to receive a pre-compressed video signal having a complexity which varies over time, said third complexity detector generating a third complexity signal which relates to said complexity of said pre-compressed video signal;
    a controller for controlling said variable compression rates of at least one of said first and second encoders based on said first, second and third complexity signals; and
    a multiplexer coupled to receive said pre-compressed video signal and said first and second compressed video signals.

5. An apparatus as defined in claim 4 additionally comprising:
    a third encoder for compressing said first video signal to generate a third compressed video signal, said third encoder being connected to transmit said third compressed video signal to said first complexity detector; and
    a fourth encoder for compressing said second video signal to generate a fourth compressed video signal, said fourth encoder being connected to transmit said fourth compressed video signal to said second complexity detector.

6. An apparatus as defined in claim 4 additionally comprising a pre-compressed video source for generating said pre-compressed video signal.

7. An apparatus as defined in claim 4 additionally comprising:
    a first buffer for temporally delaying said first video signal before said first video signal is provided to said first encoder; and
    a second buffer for temporally delaying said second video signal before said second video signal is provided to said second encoder.

8. An apparatus as defined in claim 4 wherein said controller comprises:
    means for generating a summing signal representing the sum of said complexities of said first and second video signals;
    means for generating a compression factor for one of said first and second video signals based upon said summing signal and said complexity signal for said one video signal; and
    means for causing one of said first and second encoders to compress said one video signal based on said compression factor.

9. An apparatus as defined in claim 8 wherein one of said first and second encoders includes a quantizer and wherein said means for generating a compression factor comprises means for generating a quantizing factor.

10. An apparatus for statistically multiplexing a plurality of pre-compressed video signals with a plurality of live video signals, said apparatus comprising:

a first complexity detector coupled to receive a first live video signal having a complexity which varies over time, said first complexity detector generating a first complexity signal which relates to said complexity of said first live video signal;

a second complexity detector coupled to receive a second live video signal having a complexity which varies over time, said second complexity detector generating a second complexity signal which relates to said complexity of said second live video signal;

a first encoder for compressing said first live video signal at a variable compression rate to generate a first compressed video signal;

a second encoder for compressing said second live video signal at a variable compression rate to generate a second compressed video signal;

a third complexity detector coupled to receive a first pre-compressed video signal having a complexity which varies over time, said third complexity detector generating a third complexity signal which relates to said complexity of said first pre-compressed video signal;

a fourth complexity detector coupled to receive a second pre-compressed video signal having a complexity which varies over time, said fourth complexity detector generating a fourth complexity signal which relates to said complexity of said second pre-compressed video signal;

a controller for controlling said variable compression rates of at least one of said first and second encoders based on said first, second, third and fourth complexity signals; and a multiplexer coupled to receive said first and second pre-compressed video signals and said first and second compressed video signals.

11. An apparatus as defined in claim 10 additionally comprising:

a third encoder for compressing said first live video signal to generate a third compressed video signal, said third encoder being connected to transmit said third compressed video signal to said first complexity detector; and a fourth encoder for compressing said second live video signal to generate a fourth compressed video signal, said fourth encoder being connected to transmit said fourth compressed video signal to said second complexity detector.

12. An apparatus as defined in claim 10 additionally comprising:

a first pre-compressed video source for generating said first pre-compressed video signal; and a second pre-compressed video source for generating said second pre-compressed video signal.

13. An apparatus as defined in claim 10 additionally comprising:

a first buffer for temporally delaying said first live video signal before said first live video signal is provided to said first encoder; and a second buffer for temporally delaying said second live video signal before said second live video signal is provided to said second encoder.

14. An apparatus as defined in claim 10 wherein said controller comprises:

means for generating a summing signal representing the sum of said complexities of said first and second video signals;

means for generating a compression factor for one of said first and second video signals based upon said summing signal and said complexity signal for said one video signal; and means for causing one of said first and second encoders to compress said one video signal based on said compression factor.

15. An apparatus as defined in claim 14 wherein one of said first and second encoders includes a quantizer and wherein said means for generating a compression factor comprises means for generating a quantizing factor.

16. A video broadcast system for statistically multiplexing a plurality of video signals and broadcasting said video signals, said system comprising:

a first complexity detector coupled to receive a first video signal having a complexity which varies over time, said first complexity detector generating a first complexity signal which relates to said complexity of said first video signal;

a second complexity detector coupled to receive a second video signal having a complexity which varies over time, said second complexity detector generating a second complexity signal which relates to said complexity of said second video signal;

a first encoder for compressing said first video signal at a variable compression rate to generate a first compressed video signal;

a second encoder for compressing said second video signal at a variable compression rate to generate a second compressed video signal;

a third complexity detector coupled to receive a pre-compressed video signal having a complexity which varies over time, said third complexity detector generating a third complexity signal which relates to said complexity of said pre-compressed video signal;

a controller for controlling said variable compression rate of at least one said first and second encoders based on said first, second and third complexity signals;

a multiplexer coupled to receive said pre-compressed video signal and said first and second compressed video signals; and means coupled to said multiplexer for receiving said video signals from said multiplexer and broadcasting said video signals to a plurality of locations remote from said multiplexer.

17. A system as defined in claim 16 wherein said broadcasting means comprises satellite broadcasting means.

18. A system as defined in claim 16 wherein said broadcasting means comprises:

a transmitter coupled to receive said video signals from said multiplexer;

a satellite coupled to receive said video signals from said transmitter;

a receiver for receiving video signals from said satellite; and a decoder connected to receive video signals from said receiver.

19. A system as defined in claim 16 additionally comprising:

a third encoder for compressing said first video signal to generate a third compressed video signal, said third encoder being connected to transmit said third compressed video signal to said first complexity detector; and a fourth encoder for compressing said second video signal to generate a fourth compressed video signal, said fourth encoder being connected to transmit said fourth compressed video signal to said second complexity detector.

20. A system as defined in claim 16 additionally comprising:
   a first buffer for temporally delaying said first video signal before said first video signal is provided to said first encoder; and
   a second buffer for temporally delaying said second video signal before said second video signal is provided to said second encoder.

21. An apparatus as defined in claim 16 wherein said controller comprises:
   means for generating a summing signal representing the sum of said complexities of said first and second video signals;
   means for generating a compression factor for one of said first and second video signals based upon said summing signal and said complexity signal for said one video signal; and
   means for causing on e of said first and second encoders to compress said one video signal based on said compression factor.

22. An apparatus as defined in claim 21 wherein one of said first and second encoders includes a quantizer and wherein said means for generating a compression factor comprises means for generating a quantizing factor.

23. A method of statistically multiplexing a plurality of video signals, said method comprising the steps of:
   (a) generating a first complexity signal for a first video signal having a complexity which varies over time;
   (b) generating a second complexity signal for a second video signal having a complexity which varies over time;
   (c) generating a third complexity signal for a pre-compressed video signal having a complexity which varies over time;
   (d) generating a first compression factor based on said first complexity signal;
   (e) generating a second compression factor based on said second complexity signal;
   (f) compressing said first video signal at a variable compression rate based upon said first compression factor to generate a first compressed video signal; and
   (g) compressing said second video signal at a variable compression rate based upon said second compression factor to generate a second compressed video signal.

24. A method as defined in claim 23 wherein said step (d) comprises the step of generating said first compression factor based on said first complexity signal and said third complexity signal.

25. A method as defined in claim 23 wherein said step (d) comprises the step of generating a quantizing factor based on said first complexity signal and said third complexity signal.

26. A method as defined in claim 23 wherein said step (d) comprises the steps of:
   (d1) generating a summing signal representing the sum of said first and second complexity signals;
   (d2) generating said first compression factor based upon said summing signal and said third complexity signal.

27. A method as defined in claim 23 additionally comprising the steps of:
   (h) multiplexing said first and second compressed video signals with said pre-compressed video signals; and
   (i) broadcasting said video signals of step (h) to a plurality of remote locations.

28. A method as defined in claim 27 wherein said step (i) comprises the steps of:
   (i1) transmitting said video signals of step (h) to a satellite;
   (i2) transmitting video signals from the satellite to a receiver; and
   (i3) transmitting video signals from the receiver to a decoder.

* * * * *